L. HOLLAND-LETZ.
SWITCH CONTROLLING MECHANISM FOR SELF RAKE REAPERS.
APPLICATION FILED JAN. 2, 1912.

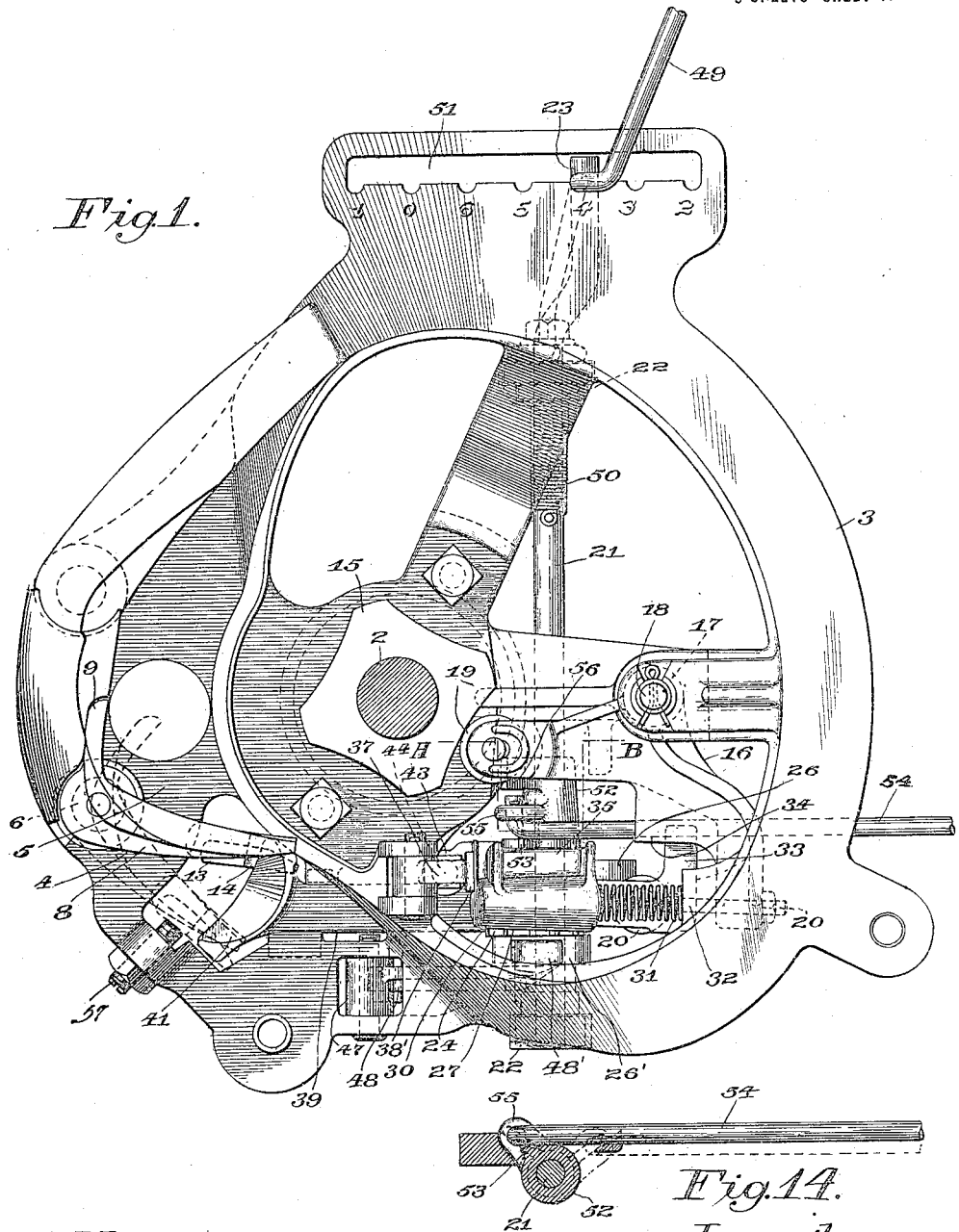

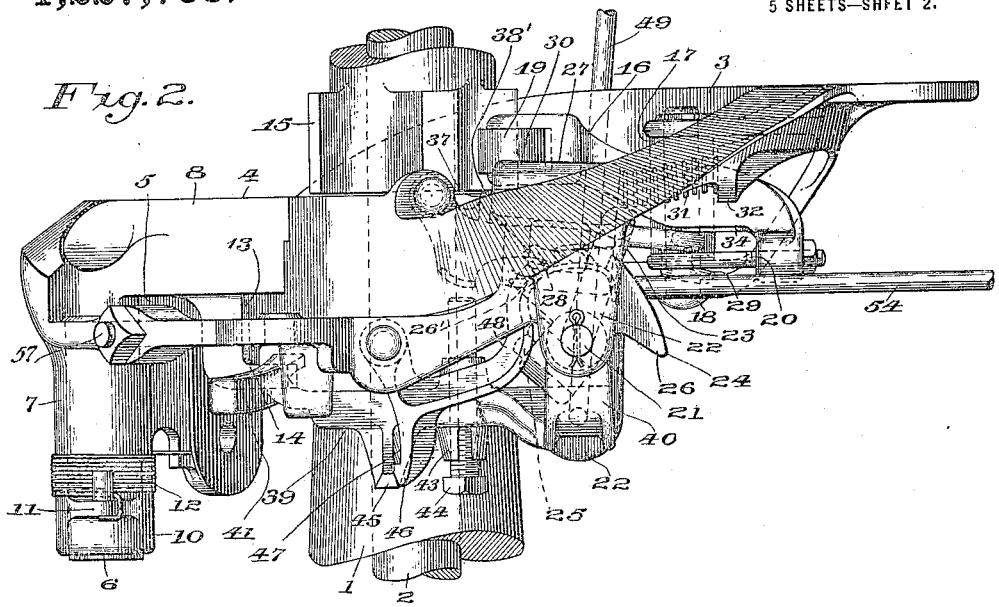

1,227,788.

Patented May 29, 1917.
5 SHEETS—SHEET 3.

Witnesses:
C. C. Palmer.
F. W. Hoffmeister.

Inventor.
Lud Holland-Letz
By E. W. Burgess
Attorney

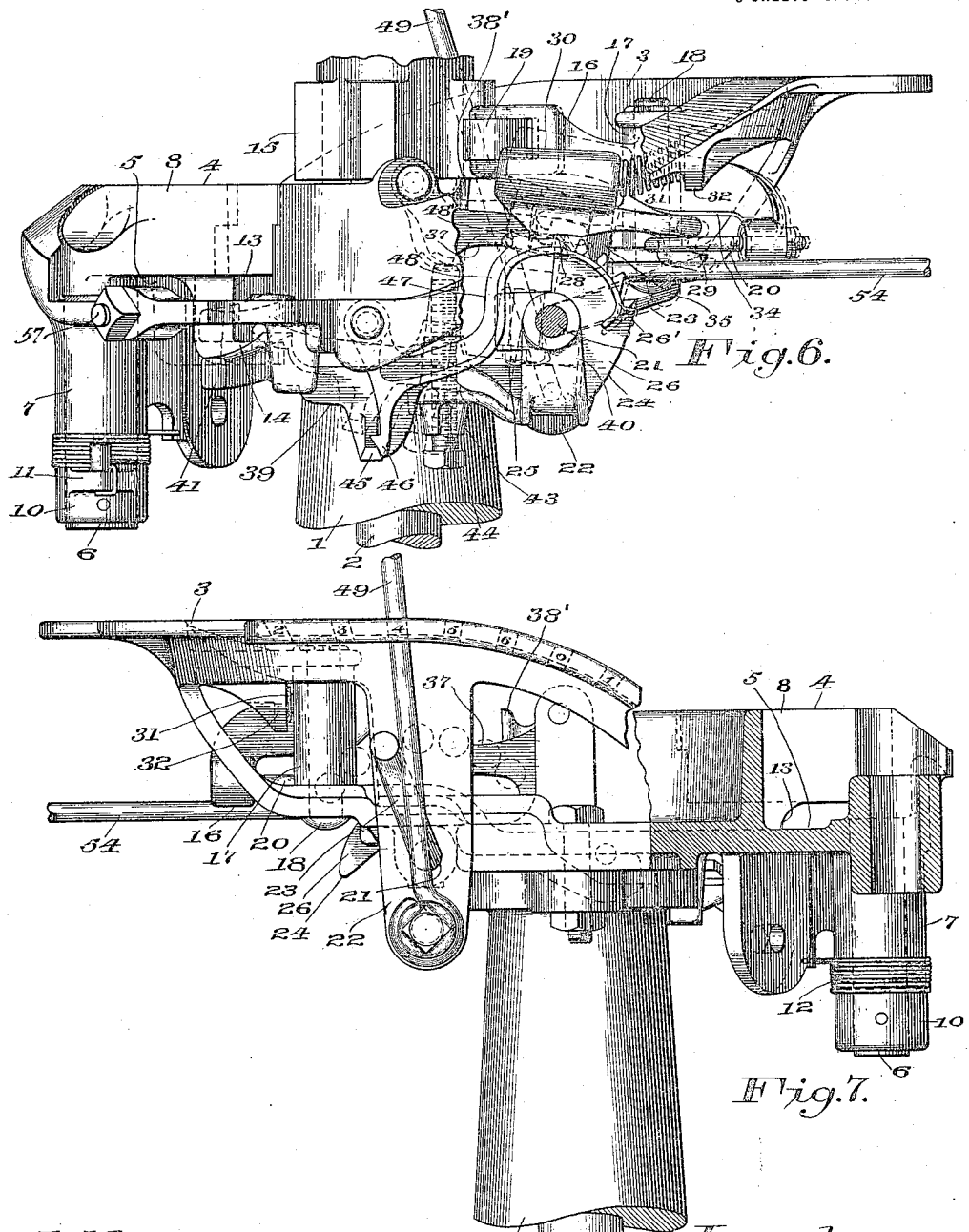

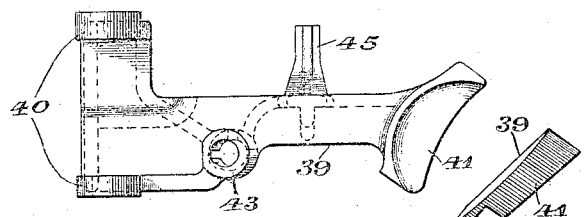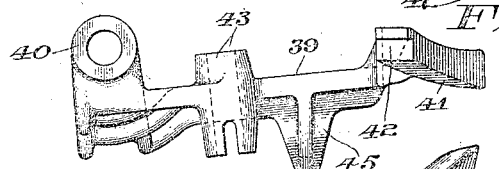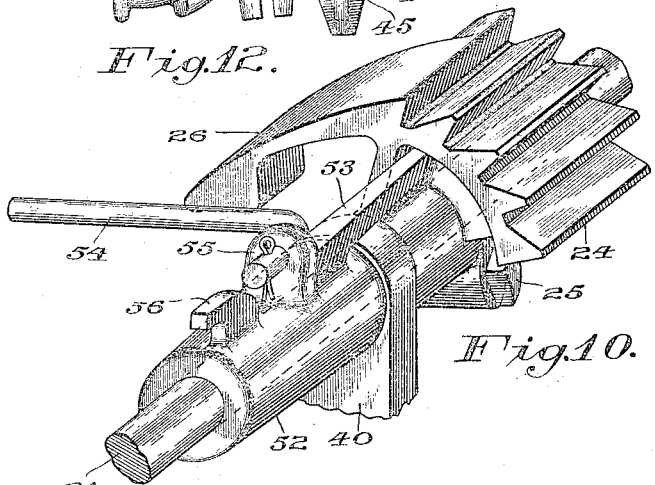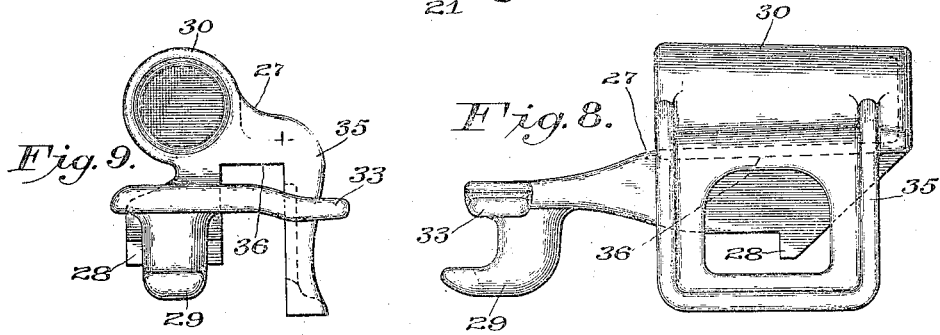

UNITED STATES PATENT OFFICE.

LUD HOLLAND-LETZ, OF CHICAGO, ILLINOIS, ASSIGNOR TO INTERNATIONAL HARVESTER COMPANY OF NEW JERSEY, A CORPORATION OF NEW JERSEY.

SWITCH-CONTROLLING MECHANISM FOR SELF-RAKE REAPERS.

1,227,788.             Specification of Letters Patent.       Patented May 29, 1917.

Application filed January 2, 1912.   Serial No. 669,025.

*To all whom it may concern:*

Be it known that I, LUD HOLLAND-LETZ, a citizen of the United States, residing at Chicago, in the county of Cook and State of Illinois, have invented certain new and useful Improvements in Switch-Controlling Mechanism for Self-Rake Reapers, of which the following is a specification.

My invention relates to switch controlling means whereby the switch will be automatically released at predetermined intervals for the purpose of permitting the rake to sweep the platform and deliver the accumulated grain therefrom, combined with means whereby the operation of the automatically operating mechanism may be temporarily suspended when it is desired to hold the grain upon the platform while turning a corner in the field and whereby the opening of the switch may be at all times under the control of the operator regardless of the position of the automatically operating mechanism; the object of the invention being to provide a mechanism that will be positive in its action and the parts thereof readily adjustable in a manner to compensate for wear thereon that would otherwise render the mechanism inoperative. These objects are attained by means of mechanism, one embodiment of which is illustrated in the accompanying drawings, in which—

Figure 1 represents a top plan view of part of a rake stand having my invention embodied in its construction;

Fig. 2 is a side elevation of Fig. 1 as looking toward the upper end of the sheet;

Fig. 3 is a side elevation of Fig. 1 as looking toward the left-hand side of the sheet;

Fig. 6 is a side elevation of Fig. 1, designed to illustrate the movement of the switch controlling mechanism;

Fig. 7 is a side elevation, partly in section, of Fig. 1, as looking toward the bottom of the sheet;

Fig. 8 represents a side elevation of a reciprocating pawl arm forming part of the switch controlling mechanism;

Fig. 9 is an end elevation of Fig. 8;

Fig. 10 is a perspective view of a toothed index sector coöperating with the pawl arm in the operation of the mechanism and showing the manner of mounting it in relation to other parts of the associated mechanism;

Fig. 11 is a top plan view of a switch latch;

Fig. 12 is a side elevation of Fig. 11;

Fig. 13 represents an end view of part of Fig. 11; and

Fig. 14 is a detail in section of part of Fig. 1 along line A—B.

The same reference characters designate like parts throughout the several views.

Figure 4:
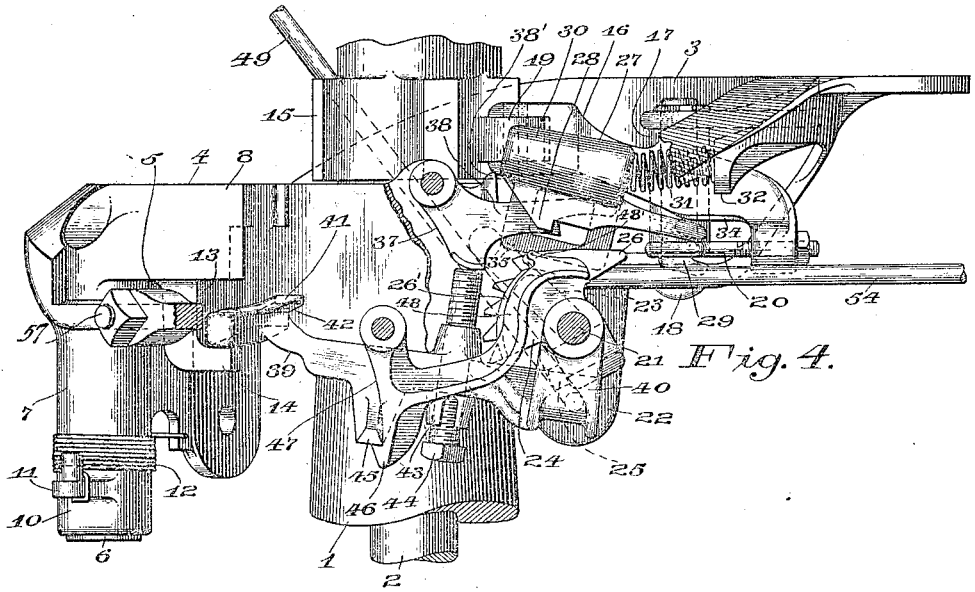
Fig. 4 is a view similar to Fig. 2 and showing the various operative parts in a different position of adjustment.

1 represents part of a rake stand, 2 a vertically arranged rake driving shaft journaled therein, 3 a rake controlling cam mounted upon the stand, the cam having a common form of pivoted switch 4 adapted to open or close a passageway 5 separating one portion of the cam from another in a manner whereby the rakes are either raised to pass over the grain upon the platform of a reaper or permitted to sweep across the platform in a manner to deliver the grain therefrom. The switch 4 is provided with a vertically arranged spindle portion 6 that is journaled in a depending sleeve 7 integral with the cam, a head portion 8 adapted to swing laterally to open or close the passageway for the rollers that are usually mounted upon the rake carrying arms, a heel portion 9 that projects into the passageway within the path of the rollers when the switch is in an open position, a collar 10 secured to the lower end of the spindle and provided with a hook portion 11 that receives one end of a spring 12 that is coiled around the lower end of the sleeve and having the opposite end thereof connected with a fixed part of the mechanism whereby the spring is operative to normally open the switch and permit a free passage of the rollers upon the rakes through the passageway between the two portions of the rake guiding cam. The switch is also provided with a depending stem portion 13 having a laterally projecting wing portion 14 at its lower end, the stem extending through an opening in the cam plate.

Secured to the rake driving shaft and rotatable therewith, is a multiple throw cam member 15, the number of throws being four to correspond with the number of rakes designed to be used, the throws being arranged at angles of 90° apart. 16 represents a bell crank lever having a vertically arranged barrel portion 17 whereby the lever is pivotally connected with the rake controlling cam by means of a pin 18, one arm of the lever being provided with a roller 19 adapted to engage the multiple throw cam 15 in a manner to rock the lever upon its axis when the cam is rotated, the remaining arm of the lever being provided with an opening that adjustably receives an eye bolt 20. 21 represents a transversely arranged rock shaft journaled in depending ear members 22 at opposite sides of the rake controlling cam, one end of the shaft being provided with a crank arm 23. 24 represents a toothed index sector secured to the opposite end of the shaft by means of a clamping bolt 25, the sector being provided with a smooth wing portion 26 approximately concentric with the axis thereof, and a laterally projecting rim portion $26^1$ in line with the roots of the teeth. 27 represents a reciprocating pawl member having at one end thereof a tooth 28 that is adapted to engage with the teeth upon the index sector 24, and a depending stem portion at the opposite end thereof that is provided with a hook portion 29 at its lower end, whereby the reciprocating pawl member 27 may be connected with the eye bolt 20 in a manner to impart a reciprocating movement to the pawl member as the rake driving shaft and the multiple throw cam member 15 secured thereto are rotated. The cam member 15 imparts a swinging movement to the bell crank lever 16 and thereby actuates the pawl member 27. The bell crank lever moves the pawl in one direction, and the pawl member is provided with a barrel portion 30 upon its upper side that receives one end of a compression spring 31, the opposite end of the spring engaging with a depending ear 32 integral with the rake cam, the spring being operative to actuate the pawl member in an opposite direction to that imparted by the bell crank lever. The pawl member is also provided with a laterally extending finger portion 33 that engages the lower surface of a web portion 34 forming part of the bell crank lever in a manner to limit a forward swinging movement of the pawl member relative to the bell crank lever, and a web portion 35 extending laterally from the lower side of the barrel portion and then downward in a manner forming a channel 36 at one side of the pawl member that is closed along its upper side and open at the ends and bottom thereof. 37 represents a gravity pawl member having a pivotal connection with a fixed part of the mechanism and adapted to engage with the teeth of the index sector successively as it is actuated by the reciprocating pawl member in a manner preventing a retrograde rocking movement of said index sector 24, the gravity pawl 37 being provided with a finger portion 38 that is received by the channel 36 of the reciprocating pawl member, and a vertically arranged ear portion $38^1$ that engages with the rear end of the reciprocating pawl member in a manner to limit a rearward movement thereof when actuated by the compression spring 31. 39 represents a rake switch latch provided at one end thereof with vertically arranged ear members 40. The ear members 40 are spaced apart and provided with laterally arranged openings therein whereby the latch 39 is pivotally mounted upon the rock shaft 21 coaxially with the index sector 24 and adapted to engage with the end of the wing portion 26 upon the index sector 24 when the latter is rocked to near the limit of its movement in one direction to the right, as shown in Fig. 6. The switch latch 39 extends from the rock shaft 21 toward the rake switch 4, and the end thereof is provided with a curved head portion 41 that is arranged concentric with the axis of the rake switch 4 and that rests upon the wing portion 14 of the rake switch 4 in a manner whereby the free end of the latch 39 is supported. The head 41 of the latch 39 is provided with a notch 42 at one side thereof permitting the latch to drop upon the wing portion 14 when the switch is turned to a closed position in a manner whereby the shoulder of the notch 42 engages with the wing portion 14 of the switch 4 and the switch is locked in its closed position until the latch is raised sufficient to release it from engagement with said wing portion 14. The latch is provided intermediate its ends with a vertically arranged barrel portion 43 that is threaded to receive a bolt 44, the upper end of the bolt engaging with the lower side of the gravity pawl 37 when the latch 39 is raised in a manner to disengage the gravity pawl 37 from the index sector 24, and at the same time cause the finger 33 upon the reciprocating pawl member 27 to raise the same out of engagement with the index sector 24. The switch latch 39 is also provided with a downwardly and laterally extending arm 45 that is adapted to engage with a hook portion 46 forming part of a swinging detent 47 having one end thereof pivotally connected with a fixed part of the mechanism and provided with an arm 48 having the end thereof provided with a laterally projecting lip portion $48^1$ that rests upon the rim 26 of the index sector 24. In Fig. 4 of the drawings this laterally projecting lip portion $48^1$, forming part of the arm 48 of the detent 47, is shown as resting upon the rim portion 26¹ of the sector 24. 49 represents a hand lever having its lower end pivotally connected with a fixed part of the mechanism and its upper end extending within convenient reach of the operator. The lever engages with the crank arm 23 of the rock shaft 21 in a manner to limit a rocking movement of said shaft in a direction opposite to that imparted thereto by the operation of the reciprocating pawl, the shaft being rocked in a direction to cause the crank to engage with the lever by means of a spring 50 coiled around said shaft and having one end thereof connected therewith and the opposite end of said spring connected with a fixed part of the mechanism. The hand lever extends upward through a slotted opening 51 formed in a laterally extended portion of the rake cam plate, the inner wall of the slot being provided with a series of notches that may selectively receive the hand lever, the resiliency of the lever being sufficient to retain it in engagement with the notches in a releasable manner. The hand lever controls the range of movement of the rock shaft and index sector 24, the sector receiving a step by step movement imparted thereto by means of the reciprocating pawl, the interval between the steps being properly timed with the rakes, and the numerals placed opposite the notches indicate the number of rakes that alternate in the operation of sweeping the grain from the platform.

Figure 5:
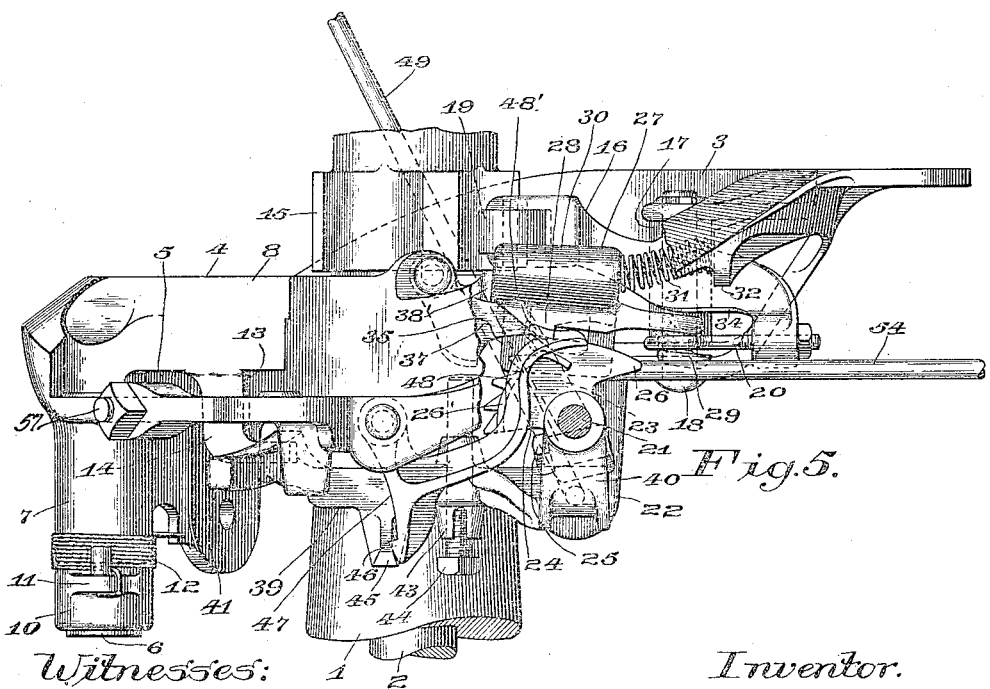
Fig. 5 is a view similar to Fig. 4 and illustrating a different adjustment of the operative parts.

In the operation of the mechanism when the hand lever 49 is moved to a position to be received by the notch designated by 0, the spring 50 will rock shaft 21 in a direction to cause the crank arm 23 thereof to engage with the lever and the index sector is thereby turned to the position shown in Fig. 5, and the wing portion 26 of the index sector 24 is within the entire path of movement of the reciprocating pawl member 27 and prevents the pawl member from engaging with the toothed portion thereof, and means are provided whereby the operator may bring the toothed portion of the index sector 24 within the path of movement of the reciprocating pawl, said means comprising a sleeve 52 loosely mounted upon the rock shaft 21, adjacent the index sector 24, and having a finger 53 projecting longitudinally therefrom and adapted to engage with the web portion of said sector, as shown in Fig. 10, in a manner to turn the index sector with the sleeve, the sleeve being turned by means of a link 54, having one end thereof connected with a laterally projecting ear 55 integral with the sleeve, and the opposite end thereof provided with means whereby it may be connected with a foot lever (not shown) within reach of the operator. The range of angular movement of the sleeve in either direction is limited by means of a longitudinally arranged wing portion 56 thereon that engages with a portion of the rake cam 3, as shown in Fig. 14. The range of angular movement of the sleeve in a forward direction is only sufficient to rock the index sector 24 to a position permitting the reciprocating pawl to engage with the rearmost tooth to the left, as shown in Fig. 6 in a manner to cause the wing portion 26 of the sector to engage with the switch latch 39 and rock it about its axis, whereby its rear end is raised out of engagement with the switch 4 and the switch is thrown open by the force of the spring 12, permitting the roller carried by the rake arm to enter the passageway between the two members of the rake controlling cam, the roller engaging with the heel of the switch 4 in a manner to return it to a closed position, and the switch latch drops by gravity as soon as the notch therein is in position to receive the wing portion 14 of the switch and the switch is thereby locked in its closed position, remaining in a closed position until the operator again manipulates the foot lever, when the switch latch is raised by means of a rocking movement of the index sector, which carries with it the gravity pawl 37, releasing it from engagement with the index sector and permitting the latter to return to its initial position as controlled by the crank arm 23 upon rock shaft 21 engaging with the hand lever. When the hand lever is moved to a position permitting it to be received by the notch designated by the numeral 1, the index sector is turned to the left to the limit of its rocking movement (Fig. 4), and the reciprocating pawl would continue to ride upon the wing portion of the sector the same as it would if the lever were received by the notch designated by 0, and none of the rakes would sweep the platform; until the operator, by means including the link 54, swings the index sector 24 to the right, as shown in Fig. 6, to the limit permitted by the wing 56, and when the pawl member 27 engages the sector 24 and thereby operates the part 26 to lift the switch lever 39. With the index sector 24 in the position indicated the swinging detent 47 is permitted to turn about the axis thereof for the reason that the front end of the rim 26¹, carried by the index sector 24, has been carried beyond the lip portion 48¹ at the end of arm 48, and the latter may swing downward during the interval of time between the opening of the rake switch 4 and its closing by means of a passing rake, causing the hook portion of the detent 47 to engage with the arm 45 upon the switch latch in a manner to suspend its operation, as shown in Fig. 4, with the switch 4 open, in which position each rake will sweep the platform. It is to be understood that the operator, after he has adjusted the hand lever to notch number 1, must manipulate the rod 54 and turn the index sector to a position permitting the reciprocating pawl to engage with the rearmost notch thereon to the left, as shown in Fig. 6, and thereby rock the sector and release the switch latch. It is also to be noted before the roller upon the rake arm has caused the switch to move to its closing position the index sector 24 has returned to its initial position having the crank arm 23 engaging the hand lever 49 and the detent 47 is swung to position to engage the latch 39 and retain it in an inoperative position indefinitely, or until the operator again manipulates the link 54. When the operator desires to suspend the operation of the rakes, as when turning the corner of a field with the machine, he will swing the sector 24 about the axis thereof to the right, as shown in Fig. 6, as by means of the foot lever (not shown) which may be connected with the link 54, releasing the detent 47 and permitting the switch latch 39 to hold the switch 4 closed, and the switch 4 will remain closed until the sector 24 is permitted to return to its initial position with the crank arm 23 engaging the hand lever 49. The operator does not keep the foot lever pressed, but releases it quickly, and the rake switch 4 will remain closed until he again swings the index sector 24 to the right, as shown in Fig. 6, so that the pawl 27 may engage therewith, when the switch latch 39 will be released, and as the sector returns, under force of spring 50, with the crank arm 23 engaging the hand lever 49 and the detent 47 engaging the latch 39, the raking action of the rakes will be resumed. The operator does not manipulate the hand lever 49 save when he wishes to change the automatic action of the mechanism. For the purpose of controlling the swinging movement of the switch 4 to an open position, and to compensate for wear upon the heel thereof by the action of the rollers, an adjustable screw 57 is received by an opening in the rake cam member in a manner whereby the inner end thereof engages with the switch as it is opened. The eye bolt 20 permits a longitudinal adjustment of the reciprocating pawl 27, and the bolt 44 may be adjusted to conpensate for wear upon the gravity pawl 37. The index sector is provided with five teeth and the multiple cam with four throws corresponding with the number of rakes. Each cam throw advances the index sector one tooth or step. If the hand lever be received by the notch designated by 6, the reciprocating pawl will engage successively with all of the teeth upon the index sector before the switch latch will be disengaged, and as one rake passes the switch at each to and fro movement of the pawl, five rakes will pass the switch before it is opened and the sixth rake will sweep the platform. If the lever be placed in the notch designated by numeral 5, then each fifth; if in 4, each fourth; if in 3, each third, and if in 2, each alternate rake will sweep the platform, and at all times the index sector 24 is under the control of the operator through the sleeve 52 loose upon the rock shaft.

In the operation of the mechanism described, it will also be noted that the latch releasing means may also be reset another way, the same occurring when the toothed index sector 24 has been pulled around by the step-by-step mechanism sufficiently to raise the latch 39 and release the switch, the depending portion 14 of the moving switch then engaging with the inclined under surface of the latch head and raising the latter and thereby the bolt 44, which in turn raises the pawls 37 and 27 to release the toothed sector so that it may again return to its initial position and be ready to be again operated. It will also be noted that due to the provision of the improved adjustable stop 57, the range of movement of the switch may be controlled, and that it is possible to thereby correct the natural tendency of the rakes to rise in sweeping the platform, ordinarily experienced when their bearings wear or when they strike heavy or bunched grain, this member 57 being adjusted inwardly to lower the rakes. It will further be noted that by this same means the sweep of the rakes relative to the platform may be adjusted so that the rakes may be made to sweep a sagged or warped platform, adjustment of the member 57 inward or outward serving to true the rakes relative to the platform through the action of the member 57 upon the switch and the resultant action of the latter upon the rake rollers. Attention is also directed to the fact that through the provision of the member 57 access may also be obtained to the latch member 39 when desired, as, for instance, when making repairs, it is only necessary for the member 57 to be screwed outward and the switch to be pulled over to its extreme open position, to permit the latch 39 to be dropped downward so that access may be readily had to the same.

While I have herein specifically described one embodiment of my invention, it is to be understood that the form chosen is used for purposes of illustration and that the same may be modified without departing from the spirit of my invention, it being my intention to include all such modifications within the scope of the appended claims.

What I claim as my invention, and desire to secure by Letters Patent, is:

1. In a reaper switch, a rake controlling cam, a pivoted switch forming a part thereof, and means whereby the range of movement of said switch may be regulated.

2. In a reaper switch, a rake controlling cam, a pivoted switch forming a part thereof, and means carried by said cam whereby the range of movement of said switch may be regulated.

3. In a reaper switch, a rake controlling cam, a pivoted switch forming a part thereof, and a member adjustably mounted on said cam and engaging said switch whereby the range of movement thereof may be regulated.

4. In a reaper switch, a frame, a sector pivoted on said frame, a holding pawl for said sector pivoted on said frame, and means whereby the range of movement of said holding pawl may be regulated.

5. In a reaper switch, a frame, a sector pivoted on said frame, a holding pawl for said sector pivoted on said frame, and independent means pivoted on the pivot of said sector and engageable with said holding pawl whereby the range of movement thereof may be regulated.

6. In a reaper switch, a frame, a sector pivoted thereon, a switch latch pivoted thereon, a holding pawl for said sector pivoted thereon, and means intermediate said switch latch and said holding pawl whereby the range of movement of the latter may be regulated.

7. In a reaper switch, a frame, a sector pivoted thereon, a switch latch pivoted thereon, a holding pawl for said sector pivoted thereon, and an adjustable member carried by said switch latch and engageable with said holding pawl whereby the range of movement of the latter may be regulated.

8. In a reaper switch mechanism, an automatic switch, a switch latch engageable therewith, mechanism for releasing said latch, and means operable by said switch upon release of said latch for permitting said latch releasing mechanism to be reset.

9. In a reaper switch mechanism, an automatic switch, a switch latch engageable therewith, step-by-step mechanism for releasing said latch from said switch, and automatic means for permitting the resetting of said step-by-step mechanism controlled by the movement of said switch.

10. In a reaper switch mechanism, a spring-pressed switch, a switch latch having an inclined surface engageable with the switch when the latch is released, latch releasing mechanism, and means controlled by said latch for permitting the resetting of said releasing mechanism.

11. In a reaper switch, a switch latch comprising an elongated body portion, an adjustable member carried thereby and disposed at an angle thereto, a switch engaging head carried on said body portion, and a downwardly and laterally extending arm carried by said body portion intermediate said adjustable member and said head.

12. In a reaper switch, a frame, a shaft journaled thereon, an index sector fixed to said shaft, a switch latch pivoted to said shaft, and means whereby when said sector is moved said switch latch is rotated about its pivot.

13. In a reaper switch, a frame, a shaft journaled thereon, an index sector fixed to said shaft, a switch latch pivoted to said shaft, means whereby when said sector is moved said switch latch is rotated about its pivot, and supplemental means for rotating said sector and thereby actuating said switch latch.

14. In a reaper switch, a frame, a spring pressed shaft journaled thereon, an index sector fixed to said shaft, a switch latch pivoted to said shaft, automatic means for intermittently actuating said sector and latch, and means whereby the former may be rotated into engagement with said latch at any desired time.

15. In a reaper switch, a frame, a shaft journaled thereon, an index sector carried on said shaft, a switch latch pivoted to said shaft and engageable by said sector, automatic intermittently operating means for throwing the sector into engagement with said latch, means whereby the interval between such engagement may be varied, and means whereby said sector may be rotated into engagement with said latch at any desired time.

16. In a reaper switch, a rake stand, a switch latch pivoted thereon having a downwardly and laterally extending arm, a detent pivoted on said stand engageable with said arm and having a laterally and upwardly extending portion, and an index sector pivoted co-axially with said switch latch having a flange thereon engageable with the laterally and upwardly extending portion of said detent.

17. In a reaper switch, a frame, a pivoted switch latch, a coaxially disposed pivoted index sector engageable with said latch, a reciprocable sector actuating pawl, resilient connections between said pawl and frame, a sector holding pawl, and means on said holding pawl for limiting the movement of said actuating pawl by said resilient connections.

18. In a reaper switch, a frame, a pivoted switch latch, a coaxially disposed pivoted index sector engageable with said latch, a sector actuating pawl carried on said frame and having a slotted portion, a spring intermediate said pawl and said stand, and a sector holding pawl carried by said frame movable in the slotted portion of said actuating pawl.

19. In a reaper switch, a frame, a pivoted switch latch, a coaxially disposed pivoted index sector engageable with said latch, a sector actuating pawl carried by said frame and having a slotted portion thereon, a spring intermediate said pawl and said frame, a holding pawl for said sector movable in the slotted portion of said actuating pawl, and means on said holding pawl for limiting the movement of said actuating pawl by said spring.

20. In a reaper switch, a rake stand, an index sector carried thereon, an actuating pawl therefor, a bell crank pivoted on said stand connected to said actuating pawl, and means intermediate said stand and pawl for limiting a forward swinging movement of the latter relative to said bell crank.

21. In a reaper switch, a rake stand, an index sector carried thereon, an actuating pawl therefor, a bell crank pivoted on said stand connected to said actuating pawl, means intermediate said stand and pawl for limiting a forward swinging movement of the latter relative to said bell crank, a holding pawl for said sector, and coöperating means on said pawl for limiting the movement of said actuating pawl.

22. In a reaper switch, a rake stand, a bell crank lever pivoted thereon, an index sector pivoted on said rake stand, a sector actuating pawl engageable with said index sector and carried on said stand, a switch latch pivoted coaxially with said sector and actuated thereby, and an adjustable connection intermediate said pawl and bell crank whereby the throw of said pawl may be regulated.

23. In a reaper switch, a rake stand, a lever pivoted thereon, a rake driving shaft actuating the same, an index sector journaled on said stand, an actuating pawl for said sector, means connecting said pawl to said lever whereby the range of movement of the former may be regulated, and a sliding connection between said lever and the non-working end of said pawl.

24. In a reaper switch, a rake stand, a shaft journaled thereon, an index sector fixed to said shaft, a switch latch journaled on said shaft, a sleeve journaled on said shaft, means whereby said sleeve may be rotated relative to the shaft, means whereby the rotation of said sleeve is imparted to said sector and latch, and means on said rake stand for limiting the rotation of said sleeve and sector.

25. In a reaper switch, a rake stand, a shaft rotatably mounted thereon, an index sector carried on said shaft, intermittently acting means for actuating the same, a sleeve journaled on said shaft, an operating member connected to said sleeve, means whereby the rotation of said sleeve is imparted to said sector, and means independent of said operating member whereby said shaft may be rotated in opposite directions.

26. A switch controlling mechanism for self-rake reapers having, in combination, a rake driving shaft, a rake controlling cam, a pivoted switch forming part of said cam, automatically operative mechanism adapted to control an opening and closing movement of said switch, and means whereby the range of movement of said switch may be regulated.

27. A switch controlling mechanism for self-rake reapers having, in combination, a rake driving shaft, a rake controlling cam, a pivoted switch forming part of said cam, automatically operative mechanism adapted to control an opening and closing movement of said switch, and an adjustable screw received by said cam and engaging with said switch whereby the range of movement of said switch may be regulated.

28. In a reaper switch, a cam track having depending lugs, a shaft journaled therein, a pivoted cam switch, a switch latch having bifurcated arms pivoted to said shaft, an index sector fixed to said shaft intermediate said arms, means for actuating said sector, a sleeve journaled on said shaft at one side of said arms, operative connections between said sleeve and sector and said sleeve and stand, a resilient connection between said shaft and cam, and means independent of said sleeve whereby said shaft may be rotated.

29. A switch controlling mechanism for self-rake reapers having, in combination, a rake driving shaft, a rake controlling cam, a pivoted switch forming part of said cam, a multiple throw cam secured to said rake driving shaft, a bell crank lever pivotally connected with a fixed part of the mechanism, having one arm thereof provided with a roller that engages with said multiple throw cam and the remaining arm thereof having connected therewith an eye bolt, a transversely arranged rock shaft journaled in bearings carried by said rake controlling cam, a toothed index sector secured to said rock shaft, a reciprocating pawl having one end adapted to engage with said toothed index sector and the opposite end thereof connected with said eye bolt, and a switch latch pivotally mounted upon said rock shaft and adapted to engage said switch in a manner to lock said switch in a closed position, said index sector being adapted to engage with said latch in a manner to release it from engagement with said switch.

30. A switch controlling mechanism for self-rake reapers having, in combination, a vertically arranged rake driving shaft, a rake controlling cam mounted upon said shaft, a pivoted rake switch forming part of said controlling cam and normally held in an open position by means of a spring, a multiple throw cam secured to said rake driving shaft, a bell crank lever pivotally connected with a fixed part of the mechanism, having one arm thereof provided with a roller that engages with said multiple throw cam, an eye bolt adjustably connected with the remaining arm of said bell crank lever, a transversely arranged rock shaft journaled in bearings carried by said rake controlling cam, a toothed index sector secured to said rock shaft, a reciprocating pawl member having one end thereof adapted to engage with said toothed sector, and the opposite end thereof connected with said eye bolt, a switch latch loosely mounted upon said rock shaft and adapted to engage said switch in a manner whereby said switch is locked in a closed position, said index sector being adapted to engage with said latch in a manner to release it from said switch, a gravity pawl engaging with said index sector in a manner preventing a retrograde movement thereof, said gravity pawl engaging with said reciprocating pawl in a manner to release said reciprocating pawl from engagement with said sector when said gravity pawl is raised, and means carried by said switch latch operative to raise said gravity pawl.

LUD HOLLAND-LETZ.

Witnesses:
C. G. GRZEGORZEWSKI,
E. L. BACON.

Copies of this patent may be obtained for five cents each, by addressing the "Commissioner of Patents, Washington, D. C."